United States Patent
Spear

(10) Patent No.: US 8,102,812 B2
(45) Date of Patent: Jan. 24, 2012

(54) METHODS AND APPARATUS FOR DATA PACKET TRANSMISSION ON A NETWORK

(75) Inventor: Stephen L. Spear, Skokie, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 538 days.

(21) Appl. No.: 11/385,367

(22) Filed: Mar. 21, 2006

(65) Prior Publication Data

US 2007/0223370 A1  Sep. 27, 2007

(51) Int. Cl.
*H04W 4/00* (2009.01)
*H04W 36/00* (2009.01)

(52) U.S. Cl. .......... 370/331; 455/436

(58) Field of Classification Search .......... 370/389, 370/331, 315
See application file for complete search history.

(56) References Cited

U.S. PATENT DOCUMENTS

| | | | |
|---|---|---|---|
| 5,940,371 A * | 8/1999 | Mitts et al. | 370/236 |
| 6,973,309 B1 | 12/2005 | Rygula | |
| 2003/0133450 A1 | 7/2003 | Baum | |
| 2004/0068580 A1 | 4/2004 | Jo et al. | |
| 2004/0219938 A1 * | 11/2004 | Parantainen et al. | 455/502 |
| 2005/0221825 A1 * | 10/2005 | Osugi | 455/436 |
| 2006/0215592 A1 * | 9/2006 | Tomoe et al. | 370/315 |
| 2007/0171870 A1 * | 7/2007 | Oba et al. | 370/331 |

FOREIGN PATENT DOCUMENTS

| | | |
|---|---|---|
| WO | 03030460 A3 | 4/2003 |
| WO | WO2004/114695 | * 12/2004 |
| WO | 2005119989 A1 | 12/2005 |

OTHER PUBLICATIONS

Shacham, R. et al.: Session Initiation Protocol (SIP) Session Mobility, draft-shacham-sipping-session-mobility-01, Sipping Internet-Draft, Expires Jan. 7, 2006, Jul. 6, 2005, pp. 1-30, draft-shacham-sipping-session-mobility-01[1].txt.

* cited by examiner

*Primary Examiner* — Dang Ton
*Assistant Examiner* — Kevin Lee

(57) ABSTRACT

A change in a client device is detected (306) during a transmission of a plurality of packets destined to at least one first destination used by at least one packet session. In response to the change, a determination (312) is made as to whether some but not all of the plurality of packets should be redirected to at least one second destination based, at least in part, on at least one predefined criterion. Accordingly, some but not all of the plurality of packets is redirected (316) to the at least one second destination when the some but not all of the plurality of packets should be redirected according to the at least one predefined criterion.

16 Claims, 4 Drawing Sheets

METHODS AND APPARATUS FOR DATA PACKET TRANSMISSION ON A NETWORK

TECHNICAL FIELD

This invention relates generally to a technique for data packet transmission on a network.

BACKGROUND

Currently, mobile-Internet Protocol ("IP") and Session Initiation Protocol ("SIP") moves all mobile-IP sessions and SIP application sessions, respectively, during handovers. Under these schemes, however, these sessions cannot be separated even if it may be logical or efficient to do. For example, there may be circumstances where only the video data need to be transmitted and/or the audio data may be sent to a different device. Moreover, given the complexity of current cellular sessions, there may also be other active sessions that do not need to be sent to the new device. Specifically, a cell phone having a multimedia session active may not necessarily want to move the Multimedia Messaging Service ("MMS"), Multimedia Broadcast/Multicast Service ("MBMS"), and other sessions, but rather, only the multimedia session should be moved. This inflexibility also cannot appropriately accommodate a multimode terminal handing over from a home wireless local area network ("WLAN") to an external access network, since most homes with broadband have an internal Network Address Translation ("NAT") that makes all of the devices in the home appear to have a single Internet Protocol address (e.g., device). Because devices, such as printer, are not typically leaving the home, it will appear as though a portion of the Internet Protocol space is moving when a multimode terminal changes its access networks. As described, these current systems provide data packet transmissions that are inflexible and inefficient and cannot effectively accommodate the flexible demands of current various networks.

BRIEF DESCRIPTION OF THE DRAWINGS

The accompanying figures, where like reference numerals refer to identical or functionally similar elements throughout the separate views and which together with the detailed description below are incorporated in and from part of the specification, serve to further illustrate various embodiments and to explain various principles and advantages all in accordance with the present invention.

Figure 1:
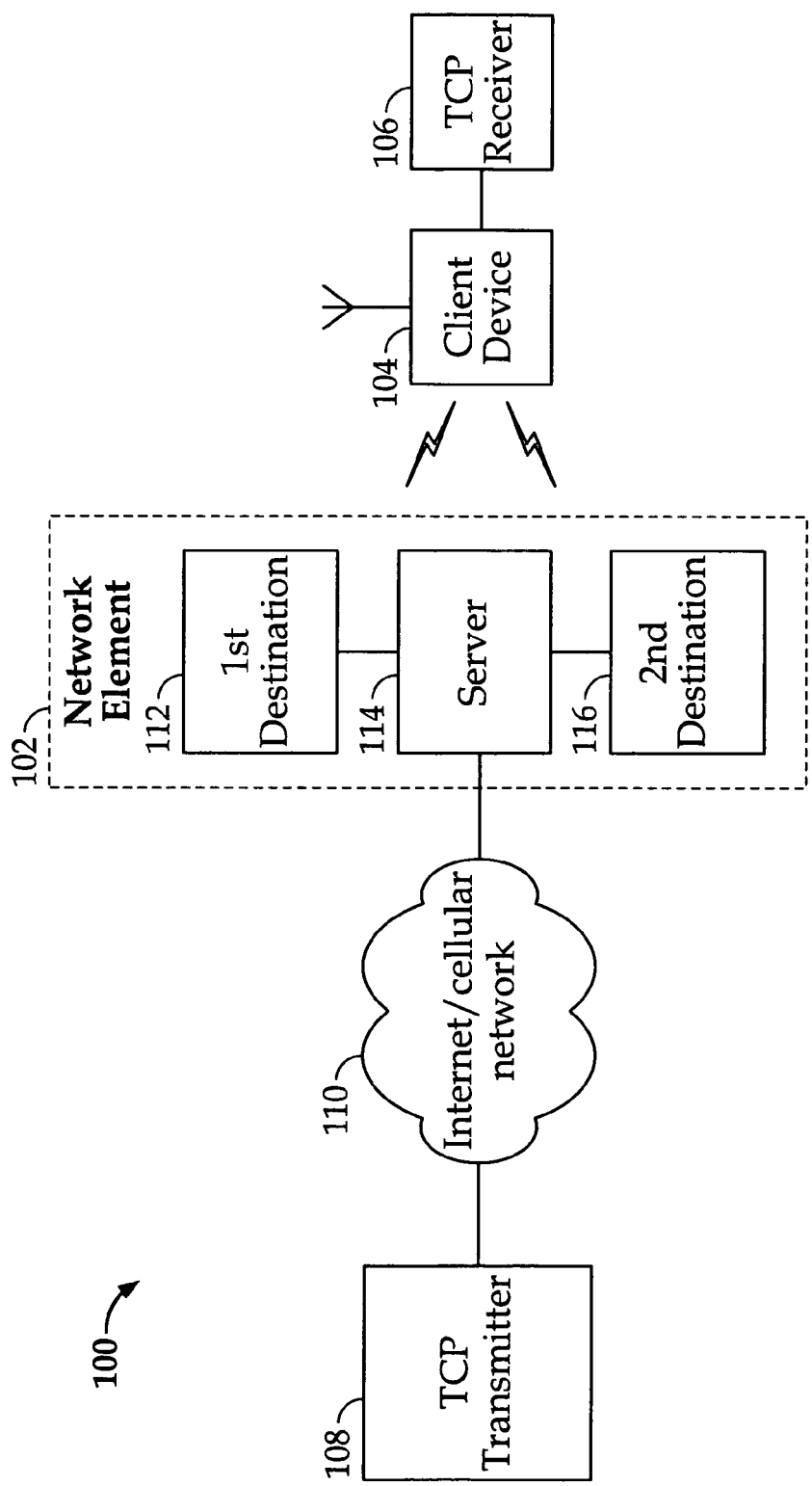
FIG. 1 comprises a block diagram of a typical wireless communication system suitable for various embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

Generally speaking, pursuant to these various embodiments, a change in a client device is detected during a transmission of a plurality of packets destined to at least one first destination used by at least one packet session. In one specific embodiment, the change in the client device is detected with a receipt of an indication of the change from the client device. In response to the change, a determination is made as to whether some but not all of the plurality of packets should be redirected to at least one second destination based, at least in part, on at least one predefined criterion. Accordingly, the some but not all of the plurality of packets is redirected to the at least one second destination when some but not all of the plurality of packets should be redirected according to the at least one predefined criterion. For particular embodiments, the redirection of these packets can be done by substituting the first destination with the second destination, tunneling the packets with the second destination, and/or duplicating the packets using the second destination.

In specific embodiments, substantially all of the plurality of packets destined to the at least one first destination used by the at least one packet session are received, and the remaining plurality of packets that are not the portions being redirected to the second destination is redirected to the first destination. In other embodiments, an assessment of the portions of the plurality of packets that should be redirected is made based, at least in part, on at least one predefined parameter. According to various embodiments, the at least one predefined parameter may be, but is not limited to, at least one source Internet Protocol address, at least one source port identifier, at least one destination port identifier, a session indicator, a flow indicator, a transport protocol type, and a transport protocol session.

For one embodiment, the at least one second destination is selected based, at least in part, on a predefined parameter, such as, but not limited to, the second destination being provided by the client device, the second destination being provided by another client device, the second destination being provided by a network infrastructure, a detection of the second destination assigned to another client device, an assignment of the second destination as the location of the client device changes, and a request of a media conversion device.

According to various embodiments, a change in a client device is detected during a transmission of a plurality of packets that are destined to at least one first destination used by at least one packet session. In response to detecting the change in the client device, substantially all of the plurality of packets are redirected to a network element that redirects some but not all of the plurality of packets to at least one second destination based, at least in part, on at least one predefined criterion.

According to various embodiments, a change in a client device is detected during a transmission of a plurality of packets destined to at least one first destination used by at least one packet session. Accordingly, an indication of the change is sent to a network element that redirects some but not all of the plurality of packets to at least one second destination based, at least in part, on at least one predefined criterion.

In various embodiments, the predefined criterion includes movement of the client device, movement of a device served by the client device out of the first destination, an instruction by a user of the client device, a connection of the client device to a new access network, loss of at least a portion of the communication links, a detection of proximity of an alternative terminal, change in client device usage of the at least one packet session, a transfer of sessions between the client device and another client device, a more suitable client device, a more suitable display, a more suitable audio device, and/or a reduction of power consumption. Moreover, the first destination may include at least one Internet Protocol address, at least one label, at least one port, at least one flow identifier, at least one virtual circuit, and/or at least one frame header. The second destination, however, may include at least one Internet Protocol address, at least one label, at least one port, at least one flow identifier, at least one virtual circuit, at least one frame header, an analog input, an analog output, a digital input, and/or a digital output.

Through the various embodiments, an improved technique for data packet transmission has been provided that, among other things, better accommodates the complexity of current packet sessions. In particular, different flows and sessions are differentiated to provide a more logical and efficient allocation of these data packets to the network addresses, resulting in a better usage of the network addresses that service these data packets. Aside from providing an improved partial Internet Protocol handover in a cellular network, the various teachings also work well with a multimode terminal handing over from a home WLAN to an external access network. For example, a video streaming on a handheld device can be automatically transferred to a monitor device when the user gets into the proximity of the monitor device in the home. Multiple user and/or network allocation improvements are provided through the various teachings described.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Referring now to the drawings, and in particular to FIG. 1, for purposes of providing an illustrative but nonexhaustive example to facilitate this description, a specific operational paradigm using a communication system is shown and indicated generally at 100. Those skilled in the art, however, will recognize and appreciate that the specifics of this illustrative example are not exhaustive of the invention and that the teachings set forth herein are applicable in a variety of alternative settings. For example, since the various teachings are not platform dependent, they can be applied to broadcast and multimedia initiatives in a 3GPP or a 3GPP2 system. Any digital broadcast services or digital satellite services are also applicable. In fact, a wired network implementation may also be desired if it experiences data packet transmission. As such, the various teachings described can be implemented in any network that transmits data packets as part of the normal operation of the network. Thus, these various platform and network implementations are within the scope of the invention, and various embodiments for these multiple implementations are readily understood and appreciated by one skilled in the art.

Pursuant to this example, using a network element 102, a client device 104 with its own Transmission Control Protocol ("TCP") receiver 106 is linked to a TCP transmitter 108 over the Internet 110. In particular, the client device 104 may be transmitting or receiving data packets on a first destination 112 via a server 114. Depending upon the predefined criterion, the network element 102, specifically the server 114 in this embodiment shown, may detect a change in the client device 104 and redirect some but not all of the data packets to a second destination 116 that may be better suited for the data packet transmission of the client device 104. Depending upon the configuration of the network, multiple ways to redirect some but not all of the data packets are contemplated, such as substituting the first destination with the second destination, tunneling the redirected packets with the second destination, and/or duplicating the redirected packets using the second destination.

One embodiment works especially well for existing home agents or servers that cannot be altered to redirect packets. To integrate various embodiments of the invention with minimal alternation to the current system, the existing home agents and/or servers are adapted to send substantially all of the data packets to a network element that then redirects the data packets. Specifically, in this embodiment, substantially all of the plurality of packets destined for the first destination are received and some but not all of these packets are accordingly redirected to the second destination based, at least in part, on at least one predefined criterion. In an embodiment, a remaining plurality of packets that are not the portions being redirected to the second destination are redirected to the first destination (with those skilled in the art understanding that this latter "redirection" is a redirection with respect to the packets having been first directed to this network element and now being directed to the first destination notwithstanding that these packets were originally targeted to that first destination).

Moreover, for various embodiments, an assessment of the plurality of data packets that should be redirected is made based, at least in part, on at least one predefined parameter, such as, but not limited to, at least one source Internet Protocol address, at least one source port identifier, at least one destination port identifier, a session indicator, a flow indicator, a transport protocol type, and/or a transport protocol session. The second destination may also be selected based, at least in part, on a predefined parameter, such as the second destination being provided by the client device, the second destination being provided by another client device, the second destination being provided by a network infrastructure, a detection of the second destination assigned to another client device, an assignment of the second destination as the location of the client device changes, and a request of a media conversion device. According to one embodiment, a change is detected in a client device during a transmission of a plurality of packets destined to at least one first destination used by at least one packet session, and in response, an indication of the change is sent to the network element that redirects some but not all of the plurality of packets to at least one second destination based, at least in part, on at least one predefined criterion.

Figure 2:
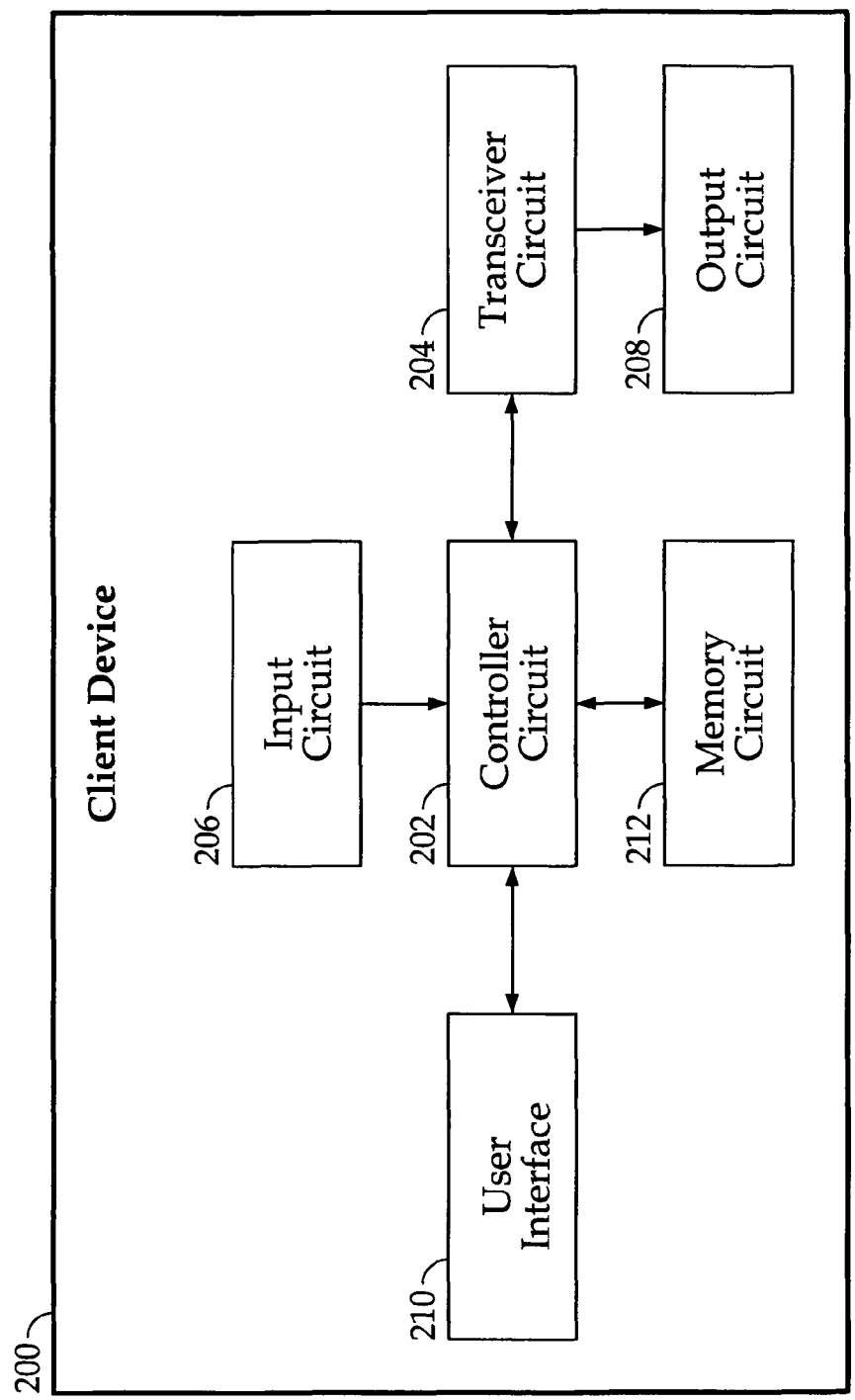
FIG. 2 comprises a block diagram of a client device suitable for various embodiments of the invention.

Referring to FIG. 2, a client device 200 suitable for various embodiments is shown. For simplicity and clarity, it should be noted that FIG. 2 does not include all the hardware components needed in a typical client device, which are commonly included and known in the art. Moreover, as a skilled artisan readily appreciates, other hardware configurations and circuitry topology layouts, although not shown, can be used to implement the various teachings described. As such, the client device 200 shown in FIG. 2 is provided as a practical example to implement the teachings of the various embodiments. As such, the client device 200 refers to any device that can transmit data packets, which includes, but is not limited to, cell phones, personal digital assistants, and/or computers. Moreover, "circuit" refers to one or more component devices such as, but not limited to, processors, memory devices, application specific integrated circuits (ASICs), and/or firmware, which are created to implement or adapted to implement (perhaps through the use of software) certain functionality, all within the scope of the various teachings described.

In this exemplary client device shown, a controller circuit 202 is included to detect a change in a client device during a transmission of a plurality of packets destined to at least one first destination used by at least one packet session. Operably coupled to the controller circuit 202, a transceiver circuit 204 is included to send an indication of the change to a network element that ultimately redirects some but not all of the plurality of packets to at least one second destination based, at least in part, on at least one predefined criterion.

In various embodiments, the predefined criterion includes movement of the client device, movement of a device served by the client device out of the first destination, an instruction by a user of the client device, a connection of the client device to a new access network, loss of at least a portion of the communication links, a detection of proximity of an alternative terminal, a change in client device usage of the at least one packet session, transfer sessions between the client device and another client device, a more suitable client device, a more suitable display, a more suitable audio device, and/or a reduction of power consumption. Moreover, the first destination may include at least one Internet Protocol address, at least one label, at least one port, at least one flow identifier, at least one virtual circuit, and/or at least one frame header. The second destination, however, may include at least one Internet Protocol address, at least one label, at least one port, at least one flow identifier, at least one virtual circuit, at least one frame header, an analog input, an analog output, a digital input, and/or a digital output.

As typically provided in a mobile station, an input circuit 206, such as a input buffer, is included to provide input data. An output circuit 208, such as an antenna, is included to provide data transmission to the infrastructure, such as the base stations. A user interface 210 is also included to obtain user inputs, and a memory circuit 212 is used to provide memory to either temporarily or permanently store information.

Figure 3:
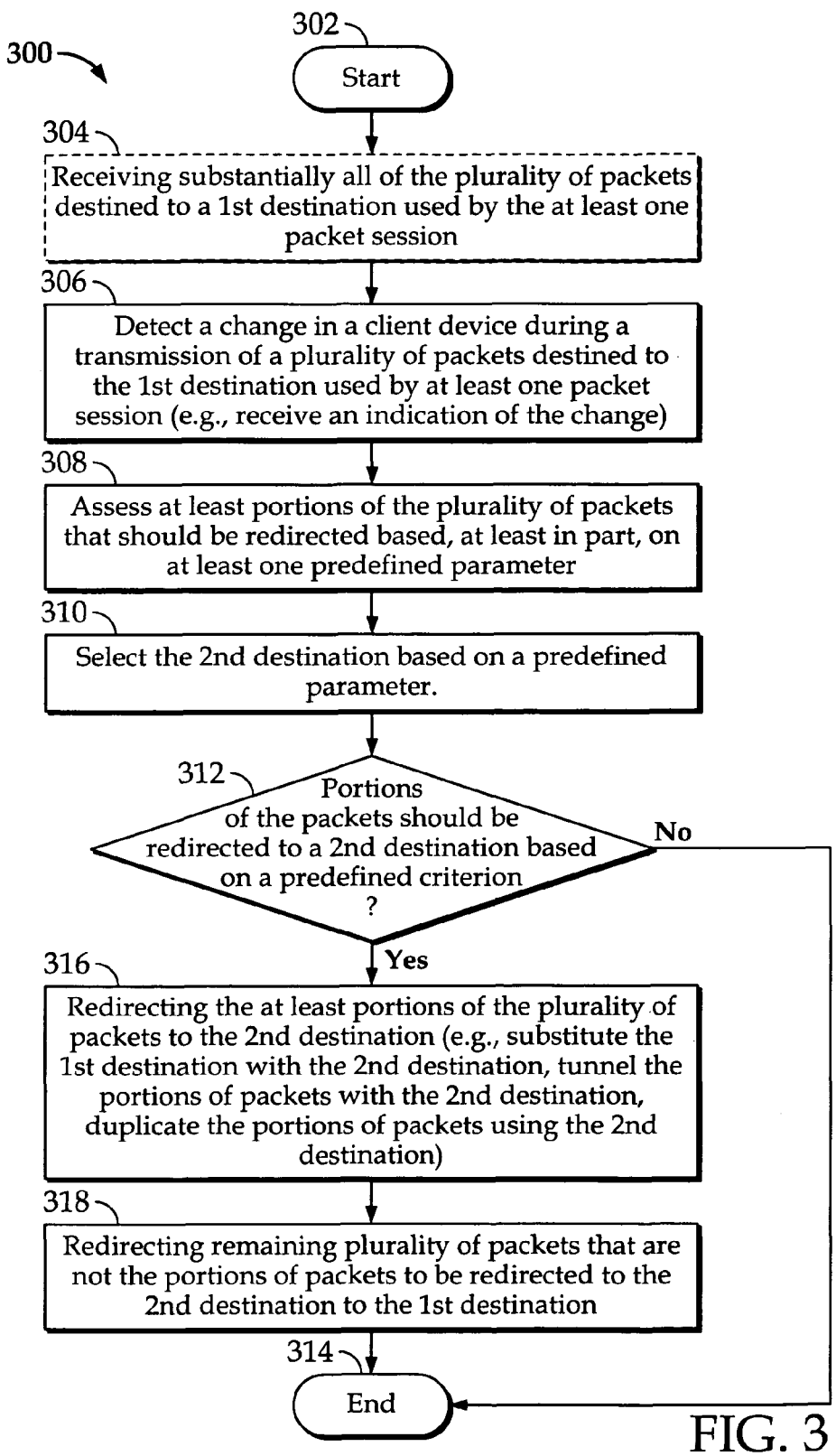
FIG. 3 comprises a flow chart diagram of a redirect process according to an embodiment of the invention.

Turning now to FIG. 3, a flow chart diagram of a redirect process according to an embodiment of the invention is shown and indicated generally at numeral reference 300. Although the process shown is preferably implemented at the network element 102, there may be other implementations of each of the processes shown that are better for other components in the infrastructure in the communication system. These processes shown, thus, can be implemented fully or partially at any of the components within the system. Moreover, as one skilled in the art can readily appreciate, any of the processes shown can be altered in multiple ways to achieve the same functions and results of the various teachings described. As a result, these processes shown are one exemplary embodiment of multiple variation embodiments that may not be specifically shown. Thus, the processes shown are directed to the system, and each of them may be altered slightly to accommodate any of the components in the communications system. These other embodiments, however, are within the scope of the various teachings described.

In light of this, the redirect process 300 starts by optionally receiving 304 substantially all of the plurality of data packets that are destined for the first destination used by the at least one packet session. According to one embodiment, the receipt of all of these data packets provides an indication for detecting 306 a change in a client device during a transmission of the plurality of packets destined to the first destination. Other detections of the change are contemplated. For example, the detected change can be obtained also through a receipt of an indication of the change from the client device, itself. Alternatively, the change in the client device can also be tracked by the network infrastructure, such as the client device being moved closer to the second destination that can better served the client device. As such, multiple embodiments of detecting the change in the client device are contemplated and are readily appreciated by one skilled in the art, which are all within the scope of the various embodiments, even if not specifically shown.

Responsive to this change in the client device, according to this embodiment shown, an assessment 308 is made as to portions of the multiple data packets that should be redirected based, at least in part, on at least one predefined parameter, such as at least one source Internet Protocol address, at least one source port identifier, at least one destination port identifier, a session indicator, a flow indicator, a transport protocol type, and a transport protocol session. In various other embodiments, the second destination may also be selected 310 based on multiple parameter of, for example, the second destination being provided by the client device, another client device, the network infrastructure, a detection of the second destination assigned to another client device, an assignment of the second destination as the location of the client device changes, and/or a request of a media conversion device.

Once the portions of packets that should be redirected and/or the second destination are obtained, a determination 312 is made as to whether these portions of data packet should, in fact, be redirected to the second destination based, at least in part, on at least one predefined criterion. According to one embodiment, this predefined criterion may include, but not limited to, movement of the client device, movement of a device served by the client device out of the first destination, an instruction by a user of the client device, a connection of the client device to a new access network, loss of at least a portion of the communication links, a detection of proximity of an alternative terminal, a change in client device usage of the at least one packet session, transfer sessions between the client device and another client device, a more suitable client device, a more suitable display, a more suitable audio device, and/or a reduction of power consumption.

If, after all, the portions of the data packets should not be redirected to the second destination, the process ends 314 at this point. If, however, the portions of the data packets should be redirected, these portions of data packets are accordingly redirected 316 to the second destination. The redirecting of these portions of packets to the second destination can be done in multiple ways, such as substituting the first destination with the second destination, tunneling of the portions of the data packet with the second destination, and/or duplicating the portions of packets using the second destination. According to one embodiment, especially for the implementation where substantially all of the packets destined for the first destination has been directed to, for example, an intervening network element as suggested above, the remaining plurality of packets that are not being redirected to the second destination are redirected 318 to the first destination, as originally intended. The process ends 314 at this point.

Figure 4:
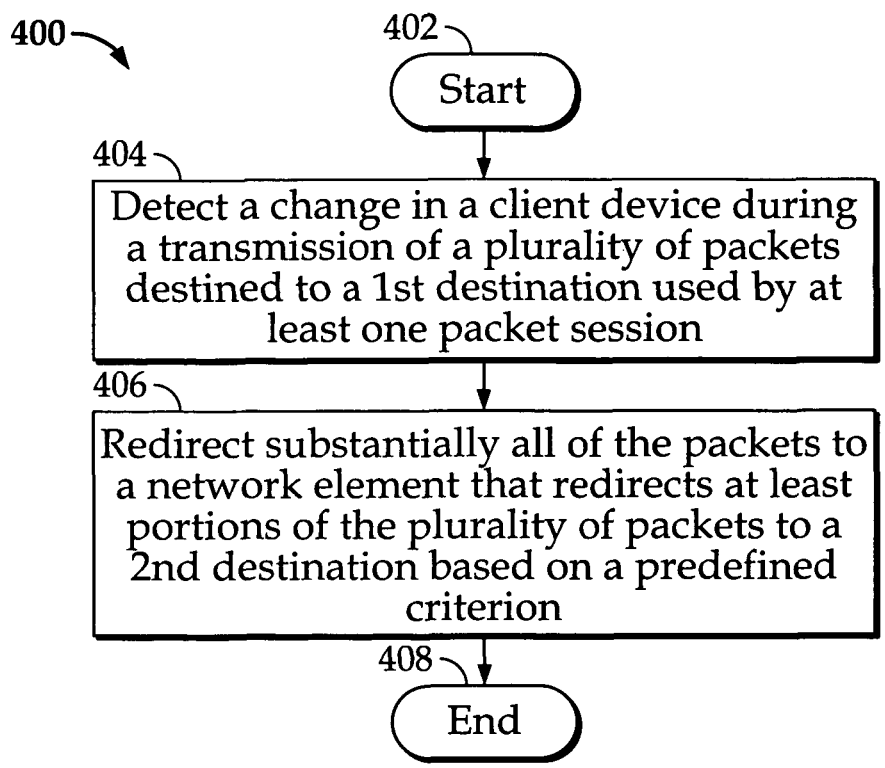
FIG. 4 comprises a flow chart diagram of a redirect process implemented according to an embodiment of the invention.

Referring now to FIG. 4, a flow chart diagram of a redirect process implemented according to an embodiment of the invention is shown and indicated generally at numeral reference 400. This particular redirect process 400, as shown, starts 402 with a detection 404 of a change in the client device during a transmission of multiple data packet destined to a first destination used by at least one packet session. In this embodiment, though, substantially all of the multiple packets are redirected 406 to a network element that, in turn, redirects some but not all of the data packets to the second destination based on the predefined criterion, which ends 408 the process at this point.

Figure 5:
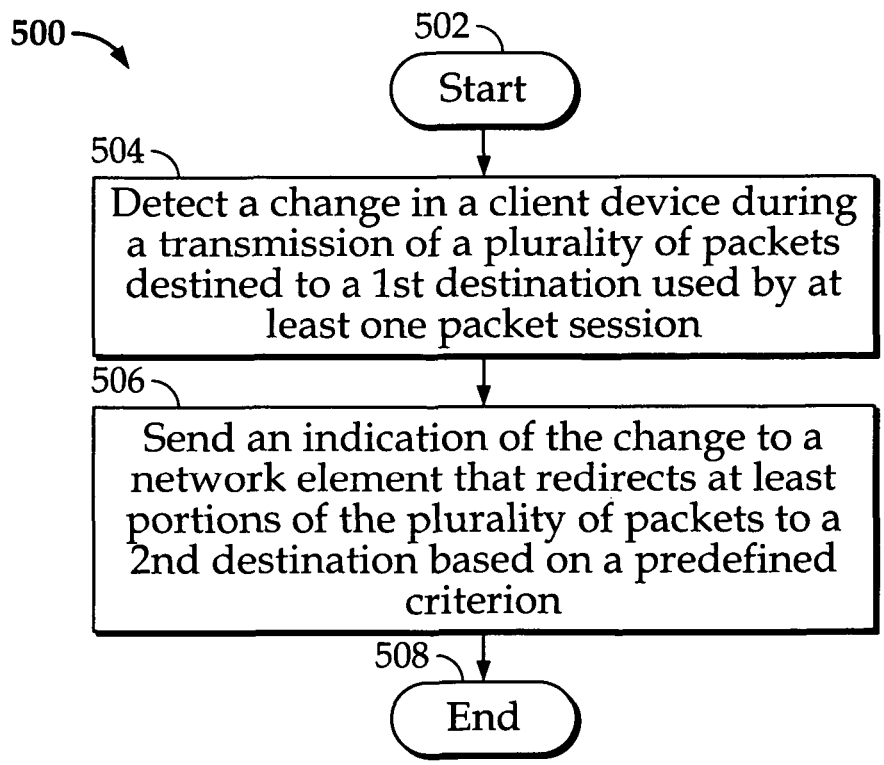
FIG. 5 comprises a flow chart diagram of an indication process according to an embodiment of the invention.

Turning now to FIG. 5, a flow chart diagram of an indication process according to an embodiment of the invention is shown and indicated generally at numeral reference 500. The indication process 500 is initiated 502, again, with a detection 504 of a change in the client device during a transmission of multiple data packets destined to the first destination used by at least one packet session. In this embodiment, responsive to this change, an indication of the change is sent 506 to a network element that subsequently redirects some but not all of the packets to the second destination based on the predefined criterion. The process ends 508 at this point.

Through the various embodiments, an improved technique for data packet transmission has been provided that, among other things, better accommodates the complexity of current packet sessions. In particular, different flows and sessions are differentiated to provide a more logical and efficient allocation of these data packets to the network addresses, resulting in a better usage of the network addresses that service these data packets. Aside from providing an improved partial Internet Protocol handover in a cellular network, the various teachings also works well with a multimode terminal handing over from a home WLAN to an external access network. For example, a video streaming on a handheld device can be automatically redirected to a monitor device when the user becomes proximal to the monitor device in the home while, for example, an audio stream as relates to a two-way communication can continue to be directed to and received at the handheld device. Multiple user and/or network allocation improvements are provided through the various teachings described.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

I claim:

1. A method for data packet transmission on a network, the method comprising the steps of:
   detecting a change in a client device during a transmission of a plurality of packets destined to at least one first destination used by at least one packet session;
   responsive to the change in the client device, determining whether some but not all of the plurality of packets should be redirected to at least one second destination based, at least in part, on at least one predefined criteria;
   redirecting the some but not all of the plurality of packets that were destined to the at least one first destination, to the at least one second destination; and
   while redirecting the some but not all of the plurality of packets to the at least one second destination, continuing to redirect remaining packets of the plurality of packets that were destined to the at least one first destination and that are not the some but not all of the plurality of packets, to the at least one first destination.

2. The method according to claim 1, wherein the predefined criteria comprises any one or more selected from a group of movement of a device served by the client device out of the first destination, an instruction by a user of the client device, a connection of the client device to a new access network, loss of at least a portion of communication links, a detection of proximity of alternative terminal, change in client device usage of the at least one packet session, transfer sessions between the client device and another client device, and a reduction of power consumption.

3. The method according to claim 1, wherein the first destination comprises any one or more selected from a group of at least one Internet Protocol address, at least one label, at least one port, at least one flow identifier, at least one virtual circuit, and at least one frame header.

4. The method according to claim 1, wherein the second destination comprises any one or more selected from a group of at least one Internet Protocol address, at least one label, at least one port, at least one flow identifier, at least one virtual circuit, and at least one frame header, an analog input, an analog output, a digital input, and a digital output.

5. The method according to claim 1, wherein detecting the change in the client device further comprises:
   receiving an indication of the change from the client device.

6. The method according to claim 1 further comprising:
   receiving, by a network element, all of the plurality of packets destined to the at least one first destination used by the at least one packet session.

7. The method according to claim 1 further comprising:
   assessing the some but not all of the plurality of packets that should be redirected based, at least in part, on at least one predefined parameter.

8. The method according to claim 7, wherein the at least one predefined parameter is selected any or more from a group of at least one source Internet Protocol address, at least one source port identifier, at least one destination port identifier, a session indicator, a flow indicator, a transport protocol type, and a transport protocol session.

9. The method according to claim 1 further comprising:
   selecting the at least one second destination based, at least in part, on a predefined parameter.

10. The method according to claim 9, wherein the predefined parameter comprises any or more selected from a group of the second destination provided by the client device, the second destination provided by another client device, the second destination provided by a network infrastructure, a detection of the second destination assigned to the another client device, an assignment of the second destination as the location of the client device changes, and a request of a media conversion device.

11. The method according to claim 1, wherein redirecting the some but not all of the plurality of packets that were destined to the at least one first destination, to the at least one second destination further comprises:

substituting the at least one first destination with the second destination.

12. The method according to claim 1, wherein redirecting the some but not all of the plurality of packets that were destined to the at least one first destination, to the at least one second destination further comprises:
tunneling the some but not all of the plurality of packets that were destined to the at least one first destination, with the at least one second destination.

13. The method according to claim 1, wherein redirecting the some but not all of the plurality of packets that were destined to the at least one first destination, to the at least one second destination further comprises:
duplicating the some but not all of the plurality of packets that were destined to the at least one first destination, using the at least one second destination.

14. A method for data packet transmission on a network, the method comprising the steps of:
detecting a change in a client device during a transmission of a plurality of packets destined to at least one first destination used by at least one packet session;
in response to detecting the change in the client device, redirecting all of the plurality of packets to a network element that: determines whether some but not all of the plurality of packets should be redirected to at least one second destination based, at least in part, on at least a predefined criteria, redirects the some but not all of the plurality of packets that were destined to the at least one first destination, to the at least one second destination, and while redirecting the some but not all of the plurality of packets to the at least one second destination, continuing to redirect remaining packets of the plurality of packets that were destined to the at least one first destination and that are not the some but not all of the plurality of packets, to the at least one first destination.

15. The method according to claim 14, wherein the at least one predefined criteria comprises any one or more selected from a group of movement of the client device out of the first destination, an instruction by a user of the client device, a connection to a new access network, loss of a communication tool, a detection of proximity of alternative terminal, change in client device usage of the at least one packet session, and transfer sessions between the client device and another client device.

16. An apparatus for data packet transmission on a network, the apparatus comprising:
a controller circuit that detects a change in a client device during a transmission of a plurality of packets destined to at least one first destination used by at least one packet session, the controller circuit determines whether some but not all of the plurality of packets should be redirected to at least one second destination based, at least in part, on at least one predefined criteria;
a transceiver circuit operably coupled to the controller circuit, wherein the transceiver circuit redirects the some but not all of the plurality of packets that were destined to the at least one first destination, to the at least one second destination and while redirecting the some but not all of the plurality of packets to the at least one second destination, continuing to redirect remaining packets of the plurality of packets that were destined to the at least one first destination and that are not the some but not all of the plurality of packets, to the at least one first destination.

* * * * *